(12) United States Patent
Etori et al.

(10) Patent No.: US 6,348,960 B1
(45) Date of Patent: Feb. 19, 2002

(54) FRONT SCATTERING FILM (75) Inventors: Hideki Etori; Toshihiro Koike, both of Urawa; Yasunori Sugiyama, Yono, all of (JP)

(73) Assignee: Kimotot Co., Ltd. (JP)

( * ) Notice: Subject to any disclaimer, the term of this patent is extended or adjusted under 35 U.S.C. 154(b) by 0 days.

(21) Appl. No.: 09/433,929

(22) Filed: Nov. 4, 1999

(30) Foreign Application Priority Data

Nov. 6, 1998 (JP) .......................................... 10-315497

(51) Int. Cl.⁷ ............................................ G02F 1/1335
(52) U.S. Cl. ........................ 349/112; 359/599; 349/122
(58) Field of Search ..................... 359/599; 349/112, 349/122

(56) References Cited

U.S. PATENT DOCUMENTS

| | | | | |
|---|---|---|---|---|
| 4,648,691 A | * | 3/1987 | Oguchi et al. | 349/112 |
| 5,995,183 A | * | 11/1999 | Tsuyoshi | 349/112 |
| 6,002,464 A | * | 12/1999 | Fujisawa et al. | 349/112 |

FOREIGN PATENT DOCUMENTS

| | | |
|---|---|---|
| JP | 8201802 | 1/1995 |
| JP | 9211496 | 10/1996 |
| JP | 11023813 | 7/1997 |
| JP | 11038208 | 7/1997 |
| JP | 11080688 | 9/1997 |
| JP | 11095012 | 9/1997 |

OTHER PUBLICATIONS

Technical Report of IEICE, 1996–02 p. 125–130.
SID 96 Digest, P614–617.
ASIA Display 95, P599–602.

* cited by examiner

*Primary Examiner*—James A. Dudek
(74) *Attorney, Agent, or Firm*—Lorusso & Loud (57) ABSTRACT

Disclosed is a front scattering film 5 which comprises a light scattering layer consisting of transparent polymer binder containing spherical microparticles 1, a transparent resin film 2 and an adhesive layer 3, wherein the spherical microparticles have a mean particle diameter of 1.0 $\mu$m to 10.0 $\mu$m, and a refractive index (n) relative to refractive index of the transparent polymer binder satisfying a condition of 0.91<n<1.09, and the front scattering film has a haze of 30.0% or more and a distinctness of image of 60.0% or more. The front scattering film according to the present invention can exhibit excellent display characteristics including performance of exhibiting paper-like white in white state and black in black state, high contrast of image display, no blurring and the like, and realize extremely easy production control thereof.

5 Claims, 2 Drawing Sheets

FRONT SCATTERING FILM

BACKGROUND OF THE INVENTION

1. Field of the Invention

The present invention relates to a front scattering film used for reflection type liquid crystal display units. In particular, the present invention relates to a front scattering film of improved optical characteristics, which is used for liquid crystal display units using a mirror reflection board as a reflective layer.

2. Related Art

Reflection type liquid crystal display units suffer from drawbacks such as lower contrast and darker display than conventional transmission type liquid crystal display units utilizing back light. However, they also have advantageous features such as thin shape, lightweight, and low electric power consumption, since they do not require aback light source in their structure. These characteristics constitute the major reason for the use of reflection type liquid crystal display units as display devices of, in particular, portable information terminals such as notebook computers, and they have attracted attention for their high utility.

The drawbacks of the reflection type liquid crystal display units, such as low contrast and dark display, mainly originate from low light utilization efficiency, and several means have been proposed to solve this problem.

Among those, the reflection type liquid crystal display unit disclosed in Japanese Patent Unexamined Publication (KOKAI) No. 8-201802/1996 has a structure comprising a mirror reflection electrode, liquid crystal layer, transparent electrodes, color filter, and transparent substrate stacked in this order, on which a birefringence film, polarizer and front scattering board are further stacked in this order, and it is a useful reflection type liquid crystal display device because it exhibits high contrast and does not suffer from problems of viewing angle dependency, double images (real image and shadow thereof) and the like.

Further, Ishinabe et al. (Shingaku Giho, 02, 125–130 (1996)) reported about some parameters using Mie's scattering theory and Hartel's theory, which parameters may be guideposts for designing a light scattering film (front scattering board) comprising spherical microparticles dispersed in a transparent medium and being suitable for a reflection type liquid crystal display unit called the R-OCB type.

However, the parameters reported in the aforementioned article do not necessarily enable design of a front scattering film having sufficient display characteristics such as performance of exhibiting paper-like whiteness in white state or blacker in black state, high contrast of image and no blurring.

Moreover, proper production control is difficult only with these several parameters. Therefore, even if a front scattering film showing paper-like white in white state, blacker in black state, high contrast or image and no blurring could be obtained, it would be extremely difficult to confirm whether it can actually exhibit sufficient visibility.

SUMMARY OF THE INVENTION

The object of the present invention is to provide a front scattering film that can exhibit excellent visibility including paper-like whiteness in white state, more blackness in black state, high contrast of image display, no blurring and the like, and realize extremely easy production control thereof.

As a result of the present inventors' studies for achieving the aforementioned object, it was found that a front scattering film having the characteristics mentioned below can exhibit an excellent visibility, including paper-like whiteness in white state, more blackness in black state, high contrast of image display, no blurring and the like.

Specifically, a front scattering film according to the present invention has a light scattering layer consisting of transparent polymer binder containing spherical microparticles, wherein the spherical microparticles have a mean particle diameter of 1.0 $\mu$m to 10.0 $\mu$m, and a refractive index (n) relative to the refractive index of the transparent polymer binder satisfying a condition of 0.91<n 1.09, and the front scattering film has a haze (cloudiness value) of 30.0% or more and a distinctness of image of 60.0% or more.

In another preferred embodiment of the aforementioned front scattering film of the present invention, at least one surface of the light scattering layer has a transparent resin film.

In a further preferred embodiment of the aforementioned front scattering film of the present invention, at least one surface of the film has adhesiveness.

In a still further preferred embodiment of the aforementioned front scattering film of the present invention, the transparent polymer binder comprises an adhesive.

The term "haze" used with respect to the present invention means a haze value determined in accordance with JIS-K7105, which can be calculated according to the equation:

$$H = T_d/T_t \times 100 \text{ [H; haze, } T_d\text{: diffused light transmittance, and } T_t\text{: total light transmittance]}.$$

The term "distinctness of image" used with respect to the present invention means a value of distinctness of image determined in accordance with JIS-K7105, and it can be obtained by measuring the maximum wave height [M] and the minimum wave height [m] at an optical comb of 0.125 mm using the transmission method, and calculating according to the following equation:

$$\text{Distinctness of image } [C_{(0.125)}] = \{M-m\}/\{M+m\} \times 100 \text{ (\%)}.$$

The value of distinctness of image used for the present invention is an average of values measured along the longitudinal direction and the transverse direction for each sample.

According to the present invention, there is provided a front scattering film that can exhibit excellent visibility including paper-like whiteness in white state and more blackness in black state, high contrast of image, no blurring and the like.

According to the present invention, there is also provided a front scattering film that realizes extremely easy production control thereof.

PREFERRED EMBODIMENTS OF THE INVENTION

The front scattering film 5 of the present invention will be explained in more detail with reference to the drawings.

The front scattering film 5 of the present invention has a light scattering layer 1 that consists of transparent polymer binder containing spherical microparticles.

In the front scattering film 5, the light scattering layer 1 may consist of a monolayer of molded transparent polymer binder film containing spherical microparticles dispersed therein, but it is preferred that at least one surface of the light scattering layer 1 has one or more other layers such as transparent resin film 2 and adhesive layer 3. By employing not the monolayer structure composed only of the light scattering layer 1 but such a structure of the light scattering layer 1 comprising a transparent resin film 2, adhesive layer 3 and the like, backward scattering light due to particles projecting from the film surface can be prevented.

The transparent resin film 2 may be composed of, for example, polyethylene, polypropylene, polyethylene terephthalate, polycarbonate, polystyrene, polymethyl methacrylate or the like. In view of processability and optical performance, polyethylene terephthalate, polycarbonate, and polymethyl methacrylate can preferably be used.

While thickness of the transparent resin film 2 is not particularly limited, it is preferably 25–200 $\mu$m for ease of handling.

A phase difference film or a polarization film may be used for the transparent resin film 2 in order to prevent interfacial reflection loss.

Transparency of the transparent resin film 2 is not particularly limited either, and it may be colored in order to enhance the contrast or to obtain diversified display.

As mentioned above, the light scattering layer 1 consists of a transparent polymer binder containing spherical microparticles.

The transparent polymer binder may be, for example, a thermoplastic binder, thermosetting binder, or ultraviolet curing binder. In particular, by using an adhesive that exhibits adhesiveness enabling close adhesion to an adherend as the transparent polymer binder, the light scattering layer 1 can be an adhesive light scattering layer 11, and hence a front scattering film having at least one adhesive surface can be obtained without providing an adhesive layer 3, which will be explained hereinafter. Such a structure can prevent formation of an air interface when the light scattering layer 1 is laminated on another member, and hence it can prevent deterioration of contrast resulted from degradation of blackness in black state due to reflection by such an air interface.

As the adhesive that exhibits adhesiveness enabling close adhesion to an adherend, known adhesives can be used. Examples of such adhesives include, for example, elastomeric adhesives such as those of natural rubbers, regenerated rubbers, chloroprene rubbers, nitrile rubbers, styrene/butadiene rubbers and the like, synthetic resin adhesives such as those of epoxy resins, urethane resins, acrylic resins, cyanoacrylate resins and the like, UV/EB curing adhesives, emulsion type adhesives and the like.

If difference between the refractive indices of the transparent polymer binder and the transparent resin film 2 is large, reflection may occur at their interface to degrade blackness in black state and contrast. Therefore, the difference between the refractive indices is preferably 0.3 or less.

As the spherical microparticles, inorganic microparticles such as those of silica, alumina, talc, zirconia, zinc oxide, titanium dioxide and the like can be used, but organic microparticles such as those of polymethyl methacrylate, polystyrene, polyurethane, benzoguanamine resin, silicone resin and the like are preferably used, because spherical shape can be more easily obtained with these materials.

As for particle diameter of the spherical microparticles, they preferably have a mean particle diameter of 1.0 $\mu$m to 10.0 $\mu$m, more preferably 2.0 $\mu$m to 6.0 $\mu$m. The mean particle diameter is defined to be 1.0 $\mu$m or more and 10.0 $\mu$m or less in order to sufficiently lower the ratio of backward scattering light in scattering light. By sufficiently reducing the ratio of backward scattering light in scattering light, black state of a reflection type liquid crystal display can be made blacker.

The refractive index of the spherical microparticles relative to that of the transparent polymer binder (value obtained by dividing the refractive index of spherical microparticles by the refractive index of transparent polymer binder, referred to simply as "relative refractive index" hereinafter), which is represented as n, preferably satisfies a condition of $0.91 < n < 1.09$. The relative refractive index n is defined to be more than 0.91 or less than 1.09, also aiming at sufficiently reducing the ratio of backward scattering light in scattering light.

The spherical microparticles may consist of either one kind or two or more kinds of such particles, so long as the particles satisfy the requirements described above. When two or more kinds of the spherical microparticles are used in admixture, they may be two or more kinds of the spherical microparticles different in their refractive indices, or they may be two or more kinds of the spherical microparticles different only in their diameters.

In addition to the aforementioned components, the light scattering layer 1 may contain a dispersant, leveling agent, colorant, plasticizer and the like as required.

As mentioned above, the adhesiveness of at least one surface of the front scattering film 5 can be attained by using an adhesive as the transparent polymer binder so that the light scattering layer 1 itself has adhesiveness. However, it may also be realized by an adhesive layer 3, which is provided on at least one surface of the light scattering layer 1 as a layer independent from the light scattering layer 1.

For the adhesive layer 3, which is preferably provided on at least one surface of the light scattering layer 1, known adhesives such as those used for the transparent polymer binder of the adhesive light scattering layer 11 mentioned above may be used.

Like the aforementioned transparent polymer binder composed of adhesive, the adhesive layer 3 provided on at least one surface of the light scattering layer 1 can prevent the formation of an air interface when the film is laminated on another member, and thus prevent deterioration contrast resulted from degradation of blackness in black state due to reflection by such an air interface.

Moreover, the structure comprising the adhesive layer 3 independent from the light scattering layer 1 enables freer selection of refractive index of the transparent polymer binder used for the light scattering layer 1, compared with the structure comprising the adhesive light scattering layer 11. As the degree of freedom for selection of refractive index of the transparent polymer binder used for the light scattering layer 1 is increased, designing of front scattering films 5 with various scattering angle distributions becomes easier.

When one surface of the front scattering film 5 has adhesiveness as explained above, an optional separator film 4 or the like is preferably laminated on the adhesive surface to make handling of the front scattering film 5 easier.

With regard to optical characteristics of the front scattering film 5 of the present invention, it preferably has a haze of 30.0% or more, more preferably 40.0% or more. At a haze value of 30.0% or more, the front scattering light can be maintained at a certain level or higher. For example, this makes it possible to obtain an extremely high reflective index for diffused light when the obtained front scattering film 5 is laminated on an object exhibiting mirror reflection, and thus the white state of liquid crystal display using a mirror reflection board as a reflective layer can be made closer to paper-like whiteness.

Further, as for the optical characteristics of the front scattering film 5 of the present invention, the film preferably has distinctness of image determined by the transmission method of 60.0% or more, more preferably 70.0% or more. At a distinctness of image of 60.0% or more, images obtained in a liquid crystal layer can be displayed with no blurring, and excellent image display clarity can be attained.

Moreover, by defining the haze and the distinctness of image to be 30.0% or more and 60.0% or more, respectively, as the optical characteristics of the front scattering film 5, it becomes possible to surely produce front scattering films of excellent performance, and the production control therefor is made extremely easy. Thus, such extremely easy production control enables early detection of unexpected situations in the production, and it becomes possible to immediately manage such situations. This us extremely effective in preventing yield reduction.

An exemplary method for producing the front scattering film 5 will be explained hereafter.

First, the aforementioned transparent polymer binder is adjusted to a proper viscosity with a solvent or the like, and the aforementioned spherical microparticles are dispersed therein by stirring or by using a sand mill, jet mill or the like to prepare a coating solution for light scattering layer.

Then, the coating solution for light scattering layer is applied to one surface of the transparent resin film 2 by using a die coater, comma coater, bar coater, gravure coater, reverse roll coater or the like so that a layer of a predetermined thickness can be obtained, and the applied layer is dried or cured by hot air drying, UV curing or the like depending on the nature of the coating solution to form the light scattering layer 1. On the formed light scattering layer 1, the adhesive layer 3 is further formed by using any one of the aforementioned adhesives or the like, and a separator film 4 is adhered thereto to obtain a front scattering film 5 of the present invention.

In order to impart useful properties such as hard coat property and anti-reflection property to the film, for example, a hard coat layer, anti-reflection layer, non-glare layer, antistatic layer and the like can be provided on the outer surface of the transparent resin film 2. Each of these layers may be used alone, or they may be used in any combination.

EXAMPLES

The present invention will be further explained hereinafter with reference to the following examples. However, these examples should not be construed to limit the present invention. The terms "part(s)" and "%" are used on a weight basis unless otherwise indicated.

Example 1

Figure 1:
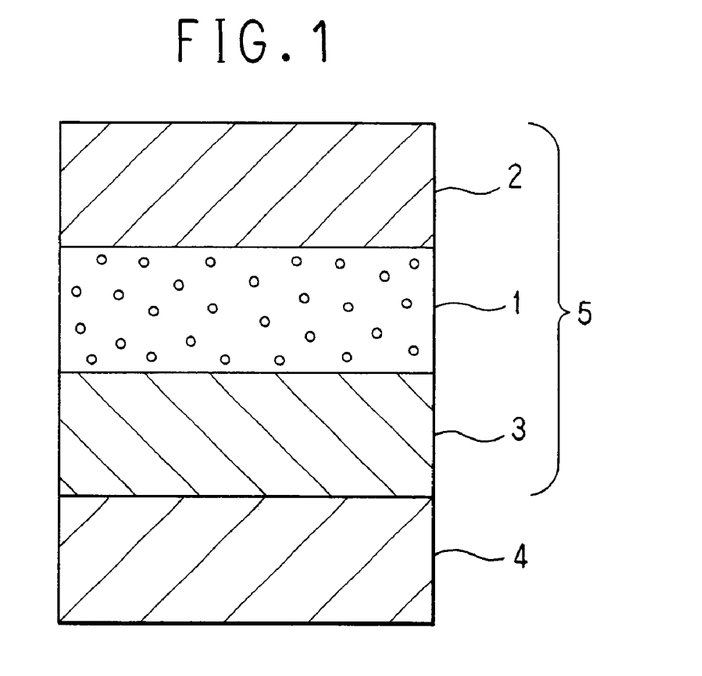
FIG. 1 represents a sectional view of an exemplary front scattering film of the present invention.

To one surface of polyethylene terephthalate film 2 having a thickness of 50 $\mu$m (Lumilar T-60, Toray Industries, Inc.), coating solution for light scattering layer a and a coating solution for adhesive layer having the compositions shown in Table 1 were successively applied, and dried to form a light scattering layer 1 having a dry thickness of 35 $\mu$m and an adhesive layer 3 having a dry thickness of 10 $\mu$m as a laminate. Then, a separator film 4 was adhered to the adhesive layer to produce a front scattering film 5 having the structure shown in FIG. 1.

Example 2

Figure 2:
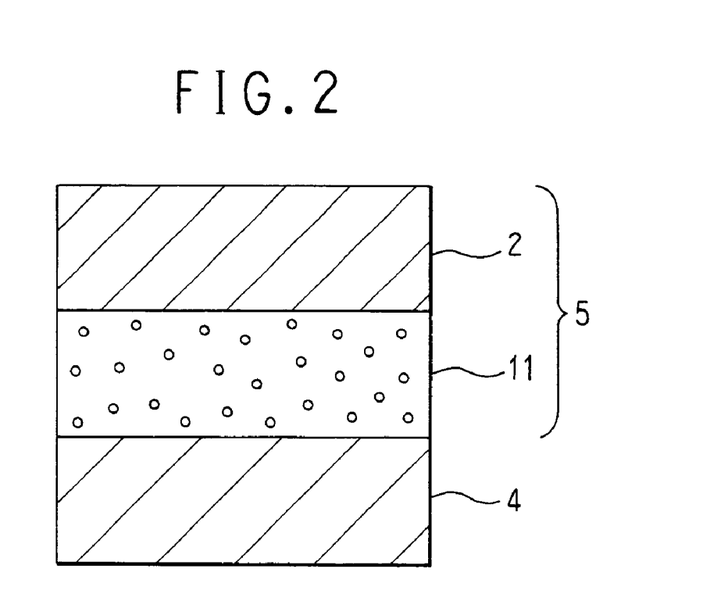
FIG. 2 represents a sectional view of another exemplary front scattering film of the present invention.

To one surface of polyethylene terephthalate film 2 having a thickness of 50 $\mu$m (Lumilar T-60, Toray Industries, Inc.), coating solution for light scattering layer b having the composition shown in Table 1 was applied, and dried to form an adhesive light scattering layer 11 having a dry thickness of 35 $\mu$m. Then, a separator film 4 was adhered to the adhesive light scattering layer to produce a front scattering film 5 having the structure shown in FIG. 2.

Example 3

To one surface of polyethylene terephthalate film 2 having a thickness of 50 $\mu$m (Lumilar T-60, Toray Industries, Inc.), coating solution for light scattering layer a and the coating solution for adhesive layer having the compositions shown in Table 1 were successively applied, and dried to form a light scattering layer 1 having a dry thickness of 35 $\mu$m and an adhesive layer 3 having a dry thickness of 10 $\mu$m as a laminate. Then, a separator film 4 was adhered to the adhesive layer to produce a front scattering film 5 having the structure shown in FIG. 1.

Example 4

To one surface of polyethylene terephthalate film 2 having a thickness of 50 $\mu$m (Lumilar T-60, Toray Industries, Inc.), coating solution for light scattering layer d having the composition shown in Table 1 was applied, and dried to form an adhesive light scattering layer 11 having a dry thickness of 35 $\mu$m. Then, a separator film 4 was adhered to the adhesive light scattering layer to produce a front scattering film 5 having the structure shown in FIG. 2.

Example 5

Figure 3:
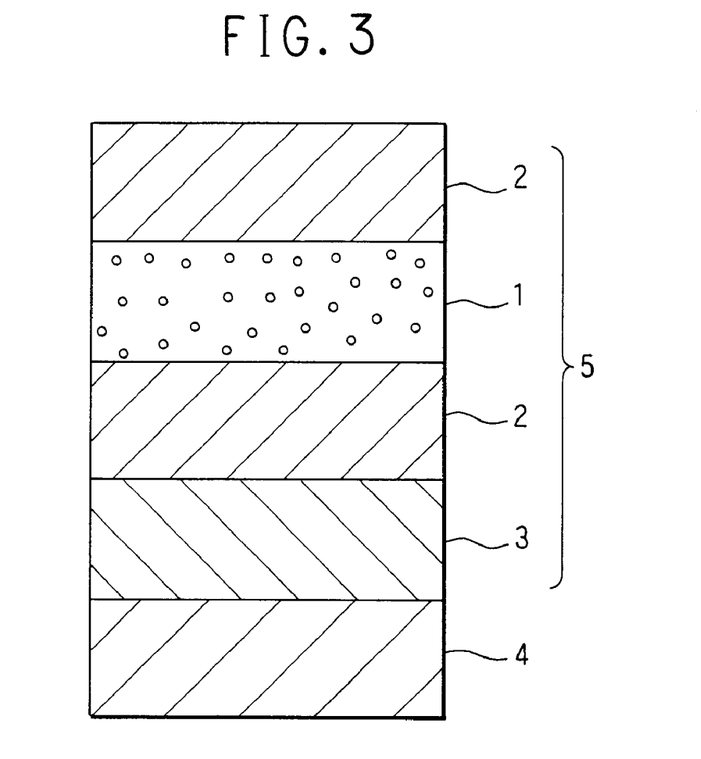
FIG. 3 represents a sectional view of a further exemplary front scatte film of the present invention.

To one surface of polyethylene terephthalate film 2 having a thickness of 50 $\mu$m (Lumilar T-60, Toray Industries, Inc.), coating solution for light scattering layer e having the composition shown in Table 1 was applied, and dried to form a light scattering layer 1 having adhesiveness and a dry thickness of 35 $\mu$m. Then, another identical polyethylene terephthalate film 2 was adhered to the light scattering layer. Then, the coating solution for adhesive layer having the composition shown in Table 1 was applied to one surface of the laminate composed of the two polyethylene terephthalate films 2 sandwiching the light scattering layer 1, and dried to form an adhesive layer 3 having a dry thickness of 10 $\mu$m. A separator film 4 was adhered to the adhesive layer to produce a front scattering film 5 having the structure shown in FIG. 3.

Example 6

To one surface of polyethylene terephthalate film 2 having a thickness of 50 $\mu$m (Lumilar T-60, Toray Industries, Inc.), coating solution for light scattering layer f having the composition shown in Table 1 was applied, and dried to form a light scattering layer 1 having adhesiveness and a dry thickness of 35 $\mu$m. Then, another identical polyethylene terephthalate film 2 was adhered to the light scattering layer.

Then, the coating solution for adhesive layer having the composition shown in Table 1 was applied to one surface of the laminate composed of the two polyethylene terephthalate films 2 sandwiching the light scattering layer 1, and dried to form an adhesive layer 3 having a dry thickness of 10μm. A separator film 4 was adhered to the adhesive layer to produce a front scattering film 5 having the structure shown in FIG. 3.

Example 7

To one surface of polyethylene terephthalate film 2 having a thickness of 50 μm (Lumilar T-60, Toray Industries, Inc.), coating solution for light scattering layer g having the composition shown in Table 1 was applied, and dried to form a light scattering layer 1 having adhesiveness and a dry thickness of 80 μm. Then, another identical polyethylene terephthalate film 2 was adhered to the light scattering layer.

Then, the coating solution for adhesive layer having the composition shown in Table 1 was applied to one surface of the laminate composed of the two polyethylene terephthalate films 2 sandwiching the light scattering layer 1, and dried to form an adhesive layer 3 having a dry thickness of 10 μm. A separator film 4 was adhered to the adhesive layer to produce a front scattering film 5 having the structure shown in FIG. 3.

Example 8

To one surface of polyethylene terephthalate film 2 having a thickness of 50 μm (Lumilar T-60, Toray Industries, Inc.), coating solution for light scattering layer h having the composition shown in Table 1 was applied, and dried to form an adhesive light scattering layer 11 having a dry thickness of 35 μm. Then, a separator film 4 was adhered to the adhesive light scattering layer to produce a front scattering film 5 having the structure shown in FIG. 2.

Example 9

To one surface of polyethylene terephthalate film 2 having a thickness of 50 μm (Lumilar T-60, Toray Industries, Inc.), coating solution for light scattering layer i having the composition shown in Table 1 was applied, and dried to form a light scattering layer 1 having adhesiveness and a dry thickness of 35 μm. Then, another identical polyethylene terephthalate film 2 was adhered to the light scattering layer.

Then, the coating solution for adhesive layer having the composition shown in Table 1 was applied to one surface of the laminate composed of the two polyethylene terephthalate films 2 sandwiching the light scattering layer 1, and dried to form an adhesive layer 3 having a dry thickness of 10 μm. A separator film 4 was adhered to the adhesive layer to produce a front scattering film 5 having the structure shown in FIG. 3.

As for the materials mentioned in Table 1, Transparent polymer resin A consisted of a polyester resin (Kemit 1249, Toray Industries, Inc.), Transparent polymer resin B consisted of an acrylic resin adhesive (Olibain BPS1109, solid content: 40%, TOYO INK MFG. CO., LTD.), Transparent polymer resin C consisted of urethane resin adhesive (Takelac A-971, solid content: 50%, Takeda Chemical Industries, Ltd.), Curing agent F consisted of an isocyanate curing agent (Olibain BHS8515, solid content: 38%, TOYO INK MFG. CO., LTD.), Curing agent G consisted of an isocyanate curing agent (Takenate A-3, solid content: 75%, Takeda Chemical Industries, Ltd.), Spherical microparticles H were silicone resin particles (Tospearl 120, mean particle diameter: 2.0 μm, Toshiba Silicone Co.), and Spherical microparticles K were polystyrene resin particles (Tecpolymer SBX-6, mean particle diameters; 6.0 μm, Sekisui Plastics Co., Ltd.), and Spherical microparticles L were acrylic resin particles (Tecpolymer MBX-5, mean particle diameters: 5.0 μm, Sekisui Plastics Co., Ltd.).

Refractive indices of the transparent polymer binders of the obtained light scattering layers (measured as for a transparent polymer film formed with a resin composition corresponding to each solution for light scattering layer from which the spherical particles were removed, after curing if the composition contained a curing agent), and refractive indices of spherical microparticles used in the examples are also shown in Table 1. The refractive indices were measured using an Abbe refractometer (Model NAR-1T, Atago Co., Ltd.).

TABLE 1

| Material | Solution for light scattering layer (parts) | | | | | | | | | Solution for adhesive layer (parts) |
| --- | --- | --- | --- | --- | --- | --- | --- | --- | --- | --- |
| | a | b | c | d | e | f | g | h | i | |
| Metyl ethyl ketone | 75.0 | | 75.0 | | 15.8 | 15.8 | 15.8 | | 15.8 | |
| Toluene | 75.0 | | 75.0 | | 15.8 | 15.8 | 15.8 | | 15.8 | |
| Ethyl acetate | | 102.2 | | 102.2 | | | | 102.2 | | 100.0 |
| Transparent polymer resin A | 100.0 | | 100.0 | | | | | | | |
| Transparent polymer resin B | | 100.0 | | 100.0 | | | | 100.0 | | 100.0 |
| Transparent polymer resin C | | | | | 100.0 | 100.0 | 100.0 | | 100.0 | |
| Curing agent F | | 2.4 | | 2.4 | | | | 2.4 | | 2.4 |
| Curing agent G | | | | | 7.6 | 7.6 | 7.6 | | 7.6 | |
| Spherical microparticles H | 3.0 | 1.7 | | | 2.4 | 4.5 | | | 0.7 | |
| Spherical microparticles K | | | 4.0 | 3.1 | | | | | | |
| Spherical microparticles L | | | | | | | | 22.3 | 6.0 | |
| Refractive index of binder | 1.56 | 1.47 | 1.56 | 1.47 | 1.50 | 1.50 | 1.50 | 1.47 | 1.50 | |

TABLE 1-continued

| | Solution for light scattering layer (parts) | | | | | | | | | Solution for adhesive |
|---|---|---|---|---|---|---|---|---|---|---|
| Material | a | b | c | d | e | f | g | h | i | layer (parts) |
| Refractive index of Spherical microparticles | 1.44 | 1.44 | 1.59 | 1.59 | 1.44 | 1.44 | 1.49 | 1.49 | 1.44 | |

Comparative Example 1

To one surface of polyethylene terephthalate film 2 having a thickness of 50 µm (Lumilar T-60, Toray Industries, Inc.), coating solution for light scattering layer j having the composition shown in Table 2 was applied, and dried to form a light scattering layer 1 having adhesiveness and a dry thickness of 35 µm. Then, another identical polyethylene terephthalate film 2 was adhered to the light scattering layer.

Then, the coating solution for adhesive layer having the composition shown in Table 1 was applied to one surface of the laminate composed of the two polyethylene terephthalate films 2 sandwiching the light scattering layer 1, and dried to form an adhesive layer 3 having a dry thickness of 10 µm. A separator film 4 was adhered to the adhesive layer to produce a front scattering film 5 having the structure shown in FIG. 3.

Comparative Example 2

To one surface of polyethylene terephthalate film 2 having a thickness of 50 µm (Lumilar T-60, Toray Industries, Inc.), coating solution for light scattering layer k having the composition shown in Table 2 was applied, and dried to form a light scattering layer 1 having adhesiveness and a dry thickness of 35 µm. Then, another identical polyethylene terephthalate film 2 was adhered to the light scattering layer.

Then, the coating solution for adhesive layer having the composition shown in Table 1 was applied to one surface of the laminate composed of the two polyethylene terephthalate films 2 sandwiching the light scattering layer 1, and dried to form an adhesive layer 3 having a dry thickness of 10 µm. A separator film 4 was adhered to the adhesive layer to produce a front scattering film 5 having the structure shown in FIG. 3.

Comparative Example 3

To one surface of polyethylene terephthalate film 2 having a thickness of 50 µm (Lumilar T-60, Toray Industries, Inc.), coating solution for light scattering layer 1 having the composition shown in Table 2 and the coating solution for adhesive layer having the compositions shown in Table 1 were successively applied, and dried to form a light scattering layer 1 having a dry thickness of 35 µm and an adhesive layer 3 having a dry thickness of 10 µm as a laminate. Then, a separator film 4 was adhered to the adhesive layer to produce a front scattering film 5 having the structure shown in FIG. 1.

Comparative Example 4

To one surface of polyethylene terephthalate film 2 having a thickness of 50 µm (Lumilar T-60, Toray Industries, Inc.), coating solution for light scattering layer m having the composition shown in Table 2 and the coating solution for adhesive layer having the compositions shown in Table 1 were successively applied, and dried to form a light scattering layer 1 having a dry thickness of 35 µm and an adhesive layer 3 having a dry thickness of 10 µm as a laminate. Then, a separator film 4 was adhered to the adhesive layer to produce a front scattering film 5 having the structure shown in FIG. 1

Comparative Example 5

To one surface of polyethylene terephthalate film 2 having a thickness of 50 µm (Lumilar T-60, Toray Industries, Inc.), coating solution for light scattering layer n having the composition shown in Table 2 was applied, and dried to form a light scattering layer 1 having adhesiveness and a dry thickness of 35 µm. Then, another identical polyethylene terephthalate film 2 was adhered to the light scattering layer.

Then, the coating solution for adhesive layer having the composition shown in Table 1 was applied to one surface of the laminate composed of the two polyethylene terephthalate films 2 sandwiching the light scattering layer 1, and dried to form an adhesive layer 3 having a dry thickness of 10 µm. A separator film 4 was adhered to the adhesive layer to produce a front scattering film 5 having the structure shown in FIG. 3.

Comparative Example 6

To one surface of polyethylene terephthalate film 2 having a thickness of 50 µm (Lumilar T-60, Toray Industries, Inc.), coating solution for light scattering layer o having the composition shown in Table 2 was applied, and dried to form a light scattering layer 1 having adhesiveness and a dry thickness of 35 µm. Then, another identical polyethylene terephthalate film 2 was adhered to the light scattering layer.

Then, the coating solution for adhesive layer having the composition shown in Table 1 was applied to one surface of the laminate composed of the two polyethylene terephthalate films 2 sandwiching the light scattering layer 1, and dried to form an adhesive layer 3 having a dry thickness of 10 µm. A separator film 4 was adhered to the adhesive layer to produce a front scattering film 5 having the structure shown in FIG. 3.

As for the materials mentioned in Table 2, Transparent polymer resin C, Curing agent G, Spherical microparticles H, K and L were the same materials as those of Table 1. Transparent polymer resin D consisted of a polystyrene resin (Styron 666R, Asahi Chemical Industry Co., Ltd.), Transparent polymer resin E consisted of an ethylcellulose resin (EHEC LOW, Hercules Co.), Spherical microparticles I were silicone resin particles (Tospearl 105, mean particle diameters: 0.5 µm. Toshiba Silicone Co.), and Spherical microparticles J were silicone resin particles (Tospeari 3120, mean particle diameters: 12.0 µm. Toshiba Silicone Co.).

Refractive indices of the transparent polymer binders of the obtained light scattering layers (measured as for a transparent polymer film formed with a resin composition corresponding to each solution for light scattering layer from which the spherical particles were removed, after curing if the composition contained a curing agent), and refractive indices of spherical microparticles used in the comparative examples are also shown in Table 2. The refractive indices were measured by using an Abbe refractometer (Model NAR-1T, Atago Co., Ltd.).

TABLE 2

| Material | Solution for light scattering layer (parts) | | | | | |
|---|---|---|---|---|---|---|
| | j | k | l | m | n | o |
| Methyl ethyl ketone | 15.8 | 15.8 | 75.0 | | 15.8 | 15.8 |
| Toluene | 15.8 | 15.8 | 75.0 | | 15.8 | 15.8 |
| Ethyl acetate | | | | 150.0 | | |
| Transparent polymer resin C | 100.0 | 100.0 | | | 100.0 | 100.0 |
| Transparent polymer resin D | | | 100.0 | | | |
| Transparent polymer resin E | | | | 100.0 | | |
| Curing agent G | 7.6 | 7.6 | | | 7.6 | 7.6 |
| Spherical microparticles H | | | 3.8 | | | 11.1 |
| Spherical microparticles I | 4.2 | | | | | |
| Spherical microparticles J | | 18.3 | | | | |
| Spherical microparticles K | | | | 6.0 | | |
| Spherical microparticles L | | | | | 11.1 | |
| Refracrive index of binder | 1.50 | 1.50 | 1.59 | 1.46 | 1.50 | 1.50 |
| Refractive index of Spherical microparticles | 1.44 | 1.44 | 1.44 | 1.59 | 1.49 | 1.44 |

The front scattering films obtained in Examples 1–9 and Comparative Examples 1–6 were used as samples. Their haze and distinctness of image were determined, and they were evaluated for contrast and blurring of images. The results are shown in Table 3. Particle diameters and relative refractive indices n of the spherical microparticles are also shown in Table 3.

The value of the haze was measured by a haze meter (HGM-2K, Suga Test Instruments Co., Ltd.) after the separator film 4 was peeled from each sample.

The value of distinctness of image was measured by an image-clarity measuring apparatus (ICM-1DP, Suga Test Instruments Co., Ltd.) after the separator film 4 was peeled from each sample.

The evaluation of the contrast was performed as follows. The separator film 4 was peeled form each sample, the sample was superimposed on an aluminum-deposited film to obtain optical close contact, and diffuse reflectance (aluminum reflectance Y) was measured by a colorimeter (SM-4-SCH-GV5-H2, Suga Test Instruments Co., Ltd.) to find a Y value of tristimulus values (JIS-Z8701). The sample was also superimposed on a black color film to obtain optical close contact, and diffuse reflectance (black reflectance Y) was measured by the same calorimeter to find a Y value of tristimulus values. Using the obtained values, the contrast was calculated by the following equation:

Contrast=(Aluminum reflectance Y)/ (Black reflectance Y).

Figure 4:
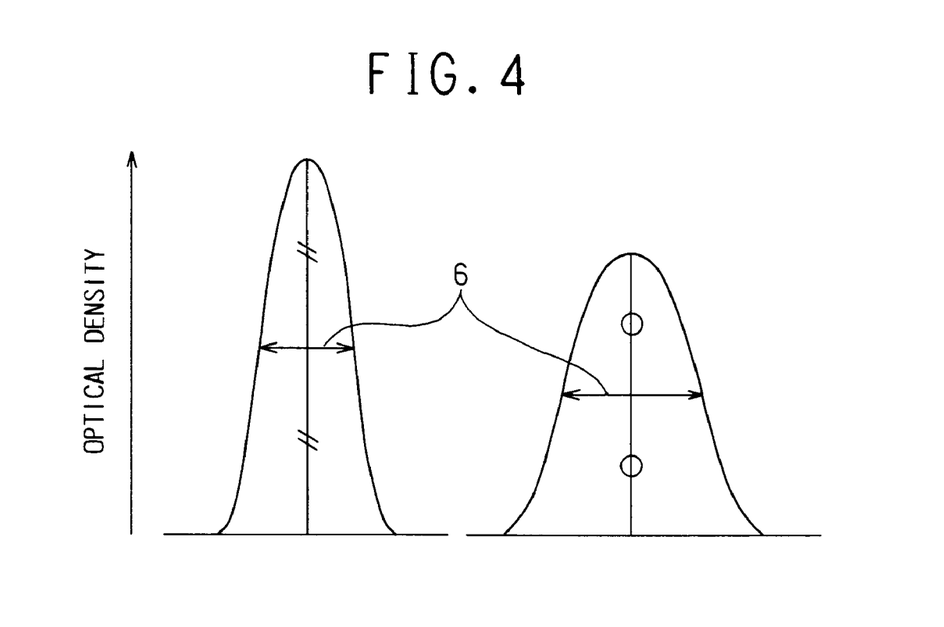
FIG. 4 represents measurement charts for the evaluation of image blurring.

The blurring of images was evaluated as follows.
1. A line drawing having a line width of 90 µm was formed on a silver film having a white base film, and a transparent resin board having a thickness of 1 mm was adhered to the film surface to prepare an evaluation standard sample.
2. On the evaluation standard sample, each of the samples of Examples and Comparative Examples whose separator film has been peeled was adhered to prepare a measurement sample.
3. Optical density of the drawing part was measured by scanning the sample using a micro densitometer (2405, Abe Design Co., Ltd.) with an optical slit width of 90 µm so as to scan across the drawing part. A measurement chart such as shown in FIG. 4 was obtained as a result of the scanning, and the half-width W (width of spectrum at a height corresponding to half of the peak height) in the chart was determined.
4. The obtained half-width W of the measurement sample was divided by a half-width $W_0$ obtained as a result of measurement using only the measurement sample not adhered with any sample of Examples and Comparative Examples, and the obtained value ($W/W_0$) was used as the degree of image blurring (i.e., degree of line thickening).

TABLE 3

| Sample | Particle diameter (µm) | n | Haze (%) | Distinctness of image (%) | Aluminum reflectance | Black reflectance | Contrast | Image blurring (W/W$_0$) |
|---|---|---|---|---|---|---|---|---|
| Example | | | | | | | | |
| 1 | 2.0 | 0.92 | 71.7 | 84.2 | 51.3 | 3.57 | 14.4 | 1.92 |
| 2 | 2.0 | 0.98 | 44.8 | 88.5 | 32.8 | 2.06 | 15.9 | 1.39 |
| 3 | 6.0 | 1.02 | 53.6 | 87.8 | 37.4 | 2.29 | 16.3 | 1.47 |
| 4 | 6.0 | 1.08 | 62.5 | 86.3 | 40.7 | 2.69 | 15.1 | 1.69 |
| 5 | 2.0 | 0.96 | 67.3 | 84.1 | 45.7 | 2.57 | 17.8 | 1.86 |
| 6 | 2.0 | 0.96 | 82.2 | 72.4 | 54.2 | 2.98 | 18.2 | 2.88 |
| 7 | 5.0 | 0.99 | 31.8 | 86.2 | 25.8 | 2.88 | 9.0 | 1.27 |
| 8 | 5.0 | 1.01 | 37.4 | 88.3 | 24.6 | 2.53 | 9.7 | 1.27 |
| 9 | 2.0 | 0.96 | 35.1 | 90.1 | 24.3 | 2.73 | 8.9 | 1.29 |
| Comparative Example | | | | | | | | |
| 1 | 0.5 | 0.96 | 59.8 | 81.6 | 41.8 | 6.03 | 6.9 | 2.26 |
| 2 | 12.0 | 0.96 | 64.3 | 80.2 | 43.2 | 5.02 | 8.6 | 2.53 |
| 3 | 2.0 | 0.91 | 51.3 | 80.6 | 36.4 | 4.56 | 8.0 | 2.37 |
| 4 | 6.0 | 1.09 | 58.0 | 82.4 | 40.1 | 5.21 | 7.7 | 2.31 |
| 5 | 5.0 | 0.99 | 7.1 | 90.5 | 11.0 | 2.36 | 4.7 | 1.21 |
| 6 | 2.0 | 0.96 | 89.7 | 52.3 | 67.0 | 3.64 | 18.4 | 4.74 |

As clearly seen from the results shown in Table 3, the samples of Examples 1–5 afforded good results for the contrast and the image blurring, and thus front scattering films 5 exhibiting an excellent visibility such as high contrast and no image blurring were obtained. Though the sample of Example 6 exhibited somewhat blur, it also provided a front scattering films having an excellent visibility and high contrast by heightening the aluminum reflectance Y to make the white state white like paper. Though the samples of Examples 7–9exhibited somewhat low contrast, it also provided a front scattering films having an excellent visibility and distinctiveness of images by reducing the backward scattering light to lower the black reflectance Y and make the black state blacker and clear.

On the other hand, in Comparative Example 1, the ratio of the backward scattering light in the scattering light could not be reduced because of the use of the spherical microparticles having a mean particle diameter of 0.5 µm. As a result, the black reflectance was increased compared with the examples. Consequently, the contrast was degraded, the blackness in the black state was deteriorated, the clearness of the image was lost and the visibility was extremely lowered.

Similarly, in Comparative Examples 2, 3 and 4, the ratio of the backward scattering light in the scattering light could not be reduced because of the use of the spherical microparticles having a mean particle diameter of 12.0 µm in Comparative Example 2, the relative refractive index n of 0.91 in Comparative Example 3, and the relative refractive index n of 1.09 in Comparative Example 4. As a result, the black reflectance was increased compared with the examples. Consequently, the contrast was degraded, the blackness in the black state was deteriorated, the clearness of the image was lost and the visibility was extremely lowered.

In Comparative Example 5, sufficient front scattering light could not be obtained because of the low haze of the sample, although the sample had the mean particle diameter of 5.0 µm and the relative refractive index n of 0.99, which satisfied the invention requirements. As a result, the aluminum reflectance was lowered compared with the examples, the contrast was extremely degraded and the visibility was extremely lowered.

In Comparative Example 6, blurring of images could not be prevented and the visibility was extremely lowered because of the low distinctness of image of the sample, although the sample had the mean particle diameter of 2.0 µm. the relative refractive index n of 0.96, and the haze of 40.0% or more, which satisfied the invention requirements.

What is claimed is:

1. A front scattering film which has a light scattering layer consisting of transparent polymer binder containing spherical microparticles, wherein the spherical microparticles have a mean particle diameter of 1.0 µm to 10.0 µm, and a refractive index (n) relative to refractive index of the transparent polymer binder satisfying a condition of $0.91 < n < 1.09$, and the front scattering film has a haze of 30.0% or more and a distinctness of image of 60.0% or more.

2. The front scattering film according to claim 1, wherein the front scattering film has a haze of 40.0% or more.

3. The front scattering film according to claim 1, wherein at least one surface of the light scattering layer has a transparent resin film.

4. The front scattering film according to claim 1, wherein at least one surface of the film has adhesiveness.

5. The front scattering film according to claim 1, wherein the transparent polymer binder comprises an adhesive.

\* \* \* \* \*

UNITED STATES PATENT AND TRADEMARK OFFICE
CERTIFICATE OF CORRECTION

PATENT NO. : 6,348,960 B1
DATED : February 19, 2002
INVENTOR(S) : Etori et al.

It is certified that error appears in the above-identified patent and that said Letters Patent is hereby corrected as shown below:

<u>Title page,</u>
Item [73], Assignee, "Kimotot" should read -- Kimoto --

<u>Column 1,</u>
Line 18, "aback" should read -- a back --

<u>Column 2,</u>
Line 43, "[$C_{0,125}$]" should read -- [$C_{0.125}$] --
Line 65, "scatte" should read -- scattering --

<u>Column 6,</u>
Line 24, "layer a" should read -- layer c --

<u>Column 9,</u>
Line 52, "layer 1" should read -- layer l --

<u>Column 13,</u>
Line 10, "9exhibited" should read -- 9 exhibited --

Signed and Sealed this

Twenty-fourth Day of September, 2002

Attest:

JAMES E. ROGAN
*Attesting Officer*  *Director of the United States Patent and Trademark Office*